METHOD OF AND APPARATUS FOR RECONDITIONING PHONOGRAPHIC RECORDS

Filed Oct. 30, 1948 3 Sheets-Sheet 1

INVENTOR
Richard M. Somers
By Henry Lanahan
ATTORNEY

METHOD OF AND APPARATUS FOR RECONDITIONING PHONOGRAPHIC RECORDS

Filed Oct. 30, 1948 3 Sheets-Sheet 2

INVENTOR
Richard M. Somers
By Henry Lanahan
ATTORNEY

METHOD OF AND APPARATUS FOR RECONDITIONING PHONOGRAPHIC RECORDS

Filed Oct. 30, 1948 3 Sheets-Sheet 3

INVENTOR
Richard M. Somers
By Henry Lanahan
ATTORNEY

Patented Dec. 11, 1951

2,578,457

UNITED STATES PATENT OFFICE 2,578,457

METHOD OF AND APPARATUS FOR RECONDITIONING PHONOGRAPHIC RECORDS

Richard M. Somers, West Orange, N. J., assignor to Thomas A. Edison, Incorporated, West Orange, N. J., a corporation of New Jersey Application October 30, 1948, Serial No. 57,522

9 Claims. (Cl. 18—5.3)

This invention relates to novel methods of and apparatus for obliterating recordations from phonographic records to recondition the records for re-use. Particularly, the invention is adapted for obliterating embossed recordations from thin, flexible disk records of thermoplastic material without having to repress the material or to mechanically engage the usable surface thereof. As will appear, the invention is equally adapted for reconditioning one or both sides of such records in one operation, as the needs may require.

The invention utilizes the inherent characteristic of thermoplastic materials, itself known in the art, that when a body of such material is deformed by cold flow and then heated to a suitable temperature while in a free state, the body will return to substantially its original shape in internal stresses which were set up therein when it was originally deformed. In the present invention this inherent characteristic is utilized to obliterate or erase embossed recordations—that is, modulated groove convolutions formed by forcibly cold-flowing the material without removing any of the material—from thin, flexible disk records of thermoplastic material, typically of copolymerized vinyl acetate and vinyl chloride known as Vinylite, or of cellulose acetate, ethyl cellulose, etc.

Disk records of such thermoplastic materials are now made in very thin form—typically .010" thickness—for use in dictating machines. The reason for making the records so thin is to reduce the material cost thereof but, notwithstanding, the cost per unit area of recorded surface from these records, even when both sides of each record are used, is substantially greater than that obtained from the cylindrical wax record so long used in the dictating-machine field. There is accordingly a great practical need for a satisfactory commercial method of obliterating embossed recordations from these records so that they can be re-used.

As far as is known, the methods heretofore commercially used for reconditioning embossed phonographic disk records of thermoplastic material have involved re-pressing the records at their melting or molding temperatures. This is the method by which the records were originally processed and requires bulky and expensive machinery and a high degree of technical skill in order to obtain the highly smooth finished surface needed for phonographic records.

In carrying out the present invention the record is heated to at least a so-called "erasing" temperature which is a temperature at which the embossed recordations suddenly disappear. This temperature is substantially lower than the melting temperature of the record material, it being for Vinylite, for instance, only of the order of 190° to 210° F. However, even at the erasing temperature, the record material is in a soft pliable condition wherein it will stick tenaciously to any solid object it may touch and be deformed by ever so little pressure of any relatively solid object against it. Moreover, in this condition, even slight impressions received in one side of a thin record of the character mentioned are reflected through to the other side to render the latter unusable. Thus, whether or not both sides of the record are to be reconditioned, it is important to avoid marring either side in the erasing operation. There is posed therefore a very difficult problem of holding the record to shape and of avoiding any damage to the usable surfaces thereof while the record is being erased.

By the present invention the record is held flat during the erasing thereof, without contacting either side of the usable portion of the record with any material, liquid or solid, which might affect the surface thereof, by subjecting the record to radial stress. This is accomplished simply by engaging the record at the central unused hub portion and spinning the record in air about its geometric axis during the reconditioning operation. Accordingly, an object of my invention is to provide a novel method of supporting and holding flat thin, flexible disk records while the records are heated to a soft pliable condition, which does not involve marring or affecting the surface thereof or soiling the surface in any way to require subsequent cleaning thereof.

This method of maintaining the record flat without mechanically affecting either side of its usable portion during the reconditioning thereof enables the reconditioning to be carried out by simple and inexpensive apparatus which can be manipulated by persons having only ordinary operating skill. Accordingly, a general object of my invention is to provide a novel and improved machine for reconditioning disk phonographic records, which is adapted for practical commercial use in offices where dictating machines are employed.

Further objects of my invention are to provide such a reconditioning machine which is small and readily portable, which is economical to operate, and which does not require any long preconditioning before it can be put into use.

Another object is to provide such a machine which is adapted for reconditioning one or both sides, as needed, of thin, flexible disk records of thermoplastic material.

Another object is to provide such a machine which will recondition thin, flexible disk records of thermoplastic material without producing any substantial dimensional changes as of the thickness or the diameters of the center hole and periphery, and which will not otherwise distort or warp the records out of shape.

A further object is to provide such a machine which will erase embossed impressions from thermoplastic materials to restore substantially the original surface thereof and, particularly as to phonograph records, it is an object to erase embossed recordations effectively and restore substantially the surface to its original condition without any substantial increase in the so-called surface noise thereof.

These and other objects and features of my invention will be apparent from the following description and the appended claims.

In the description of my invention reference is had to the accompanying drawings, of which:

Figure 1:
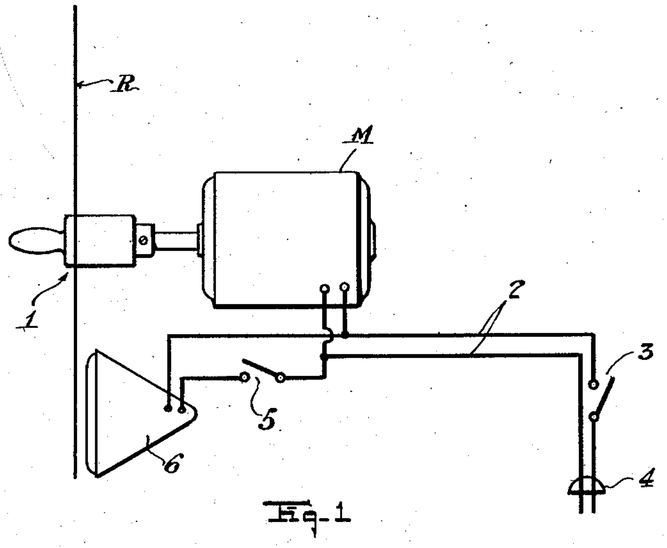
Figure 1 is a simplified diagrammatic view illustrating the principle of my invention.

In Figure 1 there is shown the basic apparatus required in carrying out the method of reconditioning disk records according to my invention. This apparatus comprises a motor M having an openable clamp 1 on the end of the shaft thereof for receiving the central hub portion of a disk record R. The motor has a power-supply circuit 2 including an on-off switch 3 and terminating in a plug 4 for connection to the socket of a power line. Also connected in this circuit 2 through a separate switch 5 is a heating lamp 6. This lamp is positioned adjacent to the usable portion of the record R for heating this portion of the record to the erasing temperature.

To recondition the record R, the same is first placed in the clamp 1 with its center at the axis of the motor shaft. The switch 3 is then closed to start the motor running, to spin the record R, a typical speed being of the order of 750 R. P. M. for a Vinylite record of .010″ thickness and 7″ diameter. The switch 5 is next closed to energize the lamp 6 and cause the outer annular portion of the record R to be raised to the erasing temperature. As soon as the grooves have disappeared—which can be detected by observing the record while it is being spun—the switch 5 is opened to cut off the lamp 6, but the motor is left on while the record is left to cool below a so-called annealing or setting temperature—which is the maximum temperature at which the record can be handled without receiving impressions from contact with solid objects. For Vinylite, this maximum annealing temperature is of the order of 140° F. After the temperature has fallen below the annealing value, the motor is turned off and the record is removed from the clamp 1. This step represents the completion of the reconditioning operation, but since in this simplified apparatus some dishing or cupping of the central hub portion of the record may occur I preferably maintain the clamp 1 at the annealing temperature at least during the cooling of the outer annular portion of the record, as is hereinafter clearly described in connection with my embodiment of Figures 3–10. Then, as soon as the record is removed from the clamp 1, it is laid on a flat surface, or preferably still is placed in a press 7 shown in Figure 2, to hold it flat under slight pressure until it is cooled fully to room temperature. This press may simply comprise a base 8 having a flat top surface 9 and cover 10 having a flat under surface 11, the cover having a pivotal and vertically-slidable connection 12 to the base as illustrated.

As is illustrated by the simplified apparatus of Figure 1, the principle of my invention by which the record is held flat without contact with any material (solid or liquid) with its usable portion is simply to subject the record to radial stress as by spinning it in air about its geometric axis. If when the record is at its erasing temperature any ever so slight discontinuity in the stress to which it is externally subjected may occur, it would cause permanent deformation—that is warping or an impression in its surface—to render the record unsuitable for further use. By the present method of supporting the record, the radial stress is planar, and is uniform in that it is the same along each radius line, to hold the record flat without contacting the usable record surface with other than air. By properly selecting the speed at which the record is turned—a typical such speed being 750 R. P. M. as aforenoted—the record is not only held flat but is prevented from being distorted radially out of round; also, at this speed the air currents which are set up are insufficient to affect the surface of the record when it is at its erasing temperature. Thus, the record material which was displaced by the embossing operation is enabled to return in response to the inherent internal restoring stress in the record material, when the record material reaches the erasing temperature, without any extraneous or external influence otherwise affecting the record surface. When a record is reconditioned by this method, the restoration of the material is so complete that the record surface noise of a reconditioned record is, on the average, only approximately 2 db higher than that of an original unused record.

It may here be noted that it is not required that the record be held perfectly flat while it is being heated to its erasing temperature, for it may be rotated at a slow speed permitting the record to flop, or may be supported in other ways permitting a substantial warping of the record, while it is at its maximum temperature. It is however important that during the cooling operation the record be spun at sufficient speed to maintain it flat until the record is cooled below its annealing temperature.

The embodiment shown in Figures 3 to 10 has a hollow base 13 comprising a top plate 14 and a rectangular container 15 having a bottom wall 16 and infolded side edges 17 on which is seated the rim portion of the top plate. On the rearward central portion of the top plate there is a hollow standard 18 having bearings 19 and 20 inset in its back and front walls near the top thereof and disposed on a front-to-back horizontal axis. These bearings receive a hollow shaft 21 having a central portion 21*a* of enlarged diameter to provide shoulders adjacent to the bearings to retain the shaft in place in its longitudinal direction. On the forward end of this shaft there is a hub 22 having a central frusto-conical portion 22*a* and a peripheral rim 22*b* providing an annular face against which the central hub portion of the record R—the annular portion immediately surrounding its central locating hole—may be clamped.

Figures 3, 4:
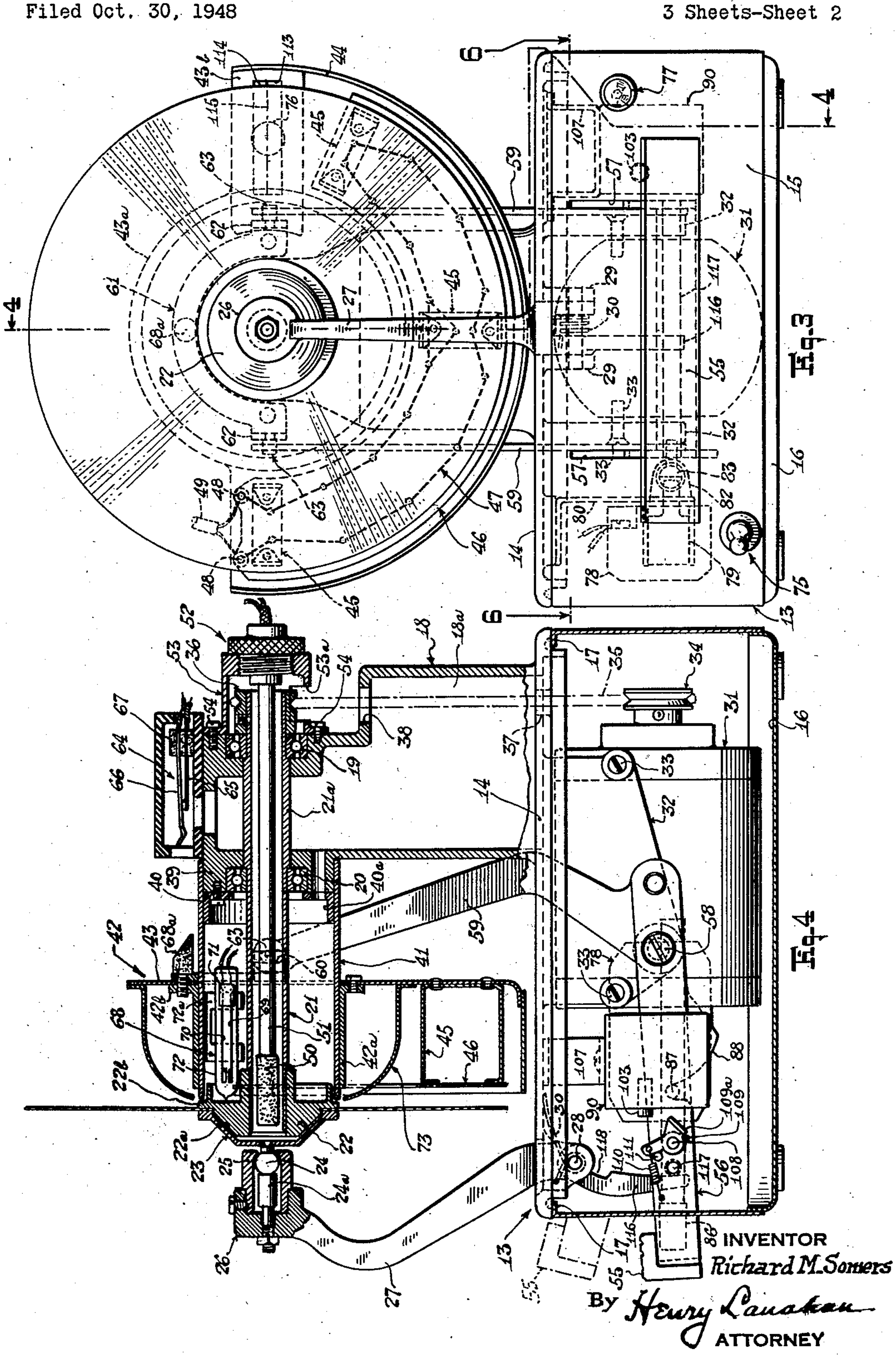
Figure 3 is an elevational end view of a machine, adapted for commercial use, for reconditioning disk records according to my invention.
Figure 4 is a vertical section taken substantially on the line 4—4 of Figure 3.

Associated with the hub 22 is a plate-shaped clamping member 23 having a ball and socket connection 24—25 at its center to an upper head portion 26 of a lever 27, there being a thrust bearing 24*a* contacting the ball 24 and threaded in the head 26. The lever 27 is pivoted on a transverse rod 28 carried at the forward central portion of the top plate 14 by two depending standards 29 thereof (Figure 3). The hub of the lever is bifurcated to receive the coil of a torsion spring 30 one end of which is hooked onto the lever and the other of which bears against the under side of the top plate to urge the lever rearwardly and thus normally retain the clamping member 23 in engagement with the hub 22.

The record is driven by a motor 31 which is supported within the base 13 between two lugs 32 depending from the top plate 14, the motor being secured to these lugs by screws 33. The motor has a drive pulley 34 at its rearward end coupled by a belt 35 to a pulley 36 secured to the rearward end of the shaft 21. This belt passes through a slot 37 in the top plate, thence through a rearward section 18*a* of reduced height of the standard 18 and next outwardly through an opening 38 in the top of this section to the pulley 36.

The bearing 20 is inset in the forwardly-extending boss 39 of the standard 18. Secured to the front face of this boss is a retaining ring 40 having a peripheral flange 40*a* forming an even extension of the periphery of the boss. Secured onto this boss and retaining ring, as by press fit, is a forwardly-extending tubular housing 41 in concentric relation to the shaft 21. A carriage 42 is mounted for movement along this housing in directions towards and away from the back side of the record R. This carriage comprises a sleeve 42*a* slidably mounted on the housing 41, which has a radial flange 42*b* at its rearward end. Riveted to this flange is a vertical supporting plate 43 having a central annular portion 43*a* wholly surrounding the housing 41 and an integral radially-extending semicircular section 43*b* below the housing 41 which is provided with a rim flange 44. This flange extends forwardly and is at a radial distance from the shaft 21 slightly greater than that of the record R to be reconditioned. Secured to the section 43*b* are three U-brackets 45 which carry a segmental annular support 46 of insulating material in parallel relation to the record R and within the contour of the flange 44. This insulating support has apertures through which there is threaded a heater winding 47 having terminals 48 at one end of the support to which a current-supply cable 49 is connected. When the carriage 42 is in its forward position shown in Figure 4, the heater winding is positioned in close proximity with the usable portion of the record R—typically about 1/4" therefrom—so that about 800 w. of heating power expended in the heater winding will bring the record, while rotating at about 750 R. P. M., to its erasing temperature in 20 to 25 seconds.

In order to reduce the time required to lower the temperature of the record from its erasing temperature to its annealing temperature, the carriage 42 is moved rearwardly from the record to space the heater at about 1 1/2" therefrom and at the same time the heater current is cut off. In so doing, the record will cool to its annealing temperature within 5 to 15 seconds.

Were the heater 47 permanently mounted at 1 1/2" spacing from the record, then as much as 2000 w. of power would be required in the heater to raise the temperature of the record to its erasing value and then only within 30 to 60 seconds. Moreover, with this greater expenditure of electric power, the heater would radiate more heat after its current is cut off. Thus, it is apparent that by moving the heater into proximity with the record during the heating interval and moving it away from the record during the cooling interval, not only is the time shortened for reconditioning the record but also substantially less electric power is required.

As aforementioned, it is desirable to maintain the hub 22 heated to approximately the annealing temperature of the record at least during the cooling interval; however, in order to simplify the apparatus the hub is heated continuously while the apparatus is in use and on standby for use. This heating is accomplished by an electric heater 50 that is mounted within the outer end portion of the hollow shaft 21. The heater is carried on the forward end of a long tube 51 which has a mounting base 52 at its rearward end. The base is threaded into the end wall of a cup-shaped bracket 53 which has a flanged rim held by screws 54 to the rearward wall of the standard 18. This bracket envelops the pulley 36 and has a clearance hole 53*a* in its under side through which passes the belt 35; also, the bracket engages the outer race of the bearing 19 to retain the bearing in place.

In close proximity with this heater 50 is a regulating thermostat 68. This thermostat may comprise, for example, a stationary switch blade 69 and a cooperating movable switch blade 70 of a suitable bimetal, the two blades being mounted in an insulating stack 71 within an evacuated envelope 72. The thermostat may be mounted on a clip 72*a* within the tubular housing 41 as shown in Figure 4. As is hereinafter made apparent, this thermostat is connected serially in the power-supply line of the heater 50. When the hub 22 is heated by the heater 50 to a predetermined maximum temperature, the thermostat opens and the hub begins to cool, and when the temperature of the hub falls to a predetermined minimum temperature the thermostat recloses to start the cycle again, causing the temperature of the hub thus to fluctuate between two set limits. These limits are such as to maintain the temperature of the hub, on the average, at approximately the annealing temperature of the record.

To conserve the heat in the hub 22, particularly when the heater 47 is in a forward, operative position, a hood 73 is mounted on the plate 43 in surrounding relation with the housing 41 as shown in Figure 4.

The carriage 42 is moved forwardly and rearwardly, to shift the heater 47 into its forward-operative and rearward-inoperative positions respectively, by means of a handle 55 at the front of the base 13. This handle is mounted on a bail 56 the two legs of which extend rearwardly through clearance slots 57 in the front wall of the base and pivot on studs 58 carried by the lugs 32. Also pivoted on each of these studs and secured to each corresponding leg of the bail 56 is an upstanding arm 59. These arms terminate at opposite sides of the shaft 21, and have vertical open-ended slots 60 in their end portions. Secured to the rearward flange 42b of the carriage 42 is an arcuate yoke 61 which overlies the tubular housing 41 and which has turned-over lugs 62 at its ends. These lugs carry respective pins 63 which slidably engage the slots 60 respectively. Thus, the handle 55 is coupled to the carriage in such manner that when the handle 55 is depressed the carriage is moved forwardly to place the heater 47 into its operative position adjacent to the record R, and when the handle is raised the carriage is moved rearwardly to place the heater 47 in its inoperative position aforementioned.

A normally-closed switch 64 is mounted on the top side of the standard 18 and is controlled by the carriage. This switch comprises a stationary contact 65 and a cooperating switch blade 66 both of which are mounted in an insulating stack 67. Secured to the yoke 61 at the crest thereof is a rearwardly-extending and wedge-shaped insulating member 68a. As the carriage 42 is moved rearwardly into its terminal position, this member 68a engages the blade 66 and cams the switch 64 open. As is hereinafter explained, this switch is serially included in a circuit of the heater 47 to open that circuit and shut off the heater when the carriage reaches its rearward position.

Figure 8:
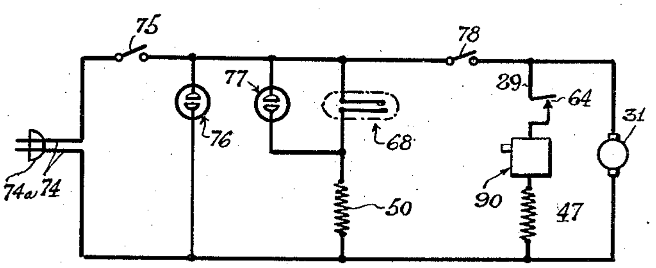
Figure 8 is a schematic circuit diagram of the machine of Figure 3.
Figures 9, 10:
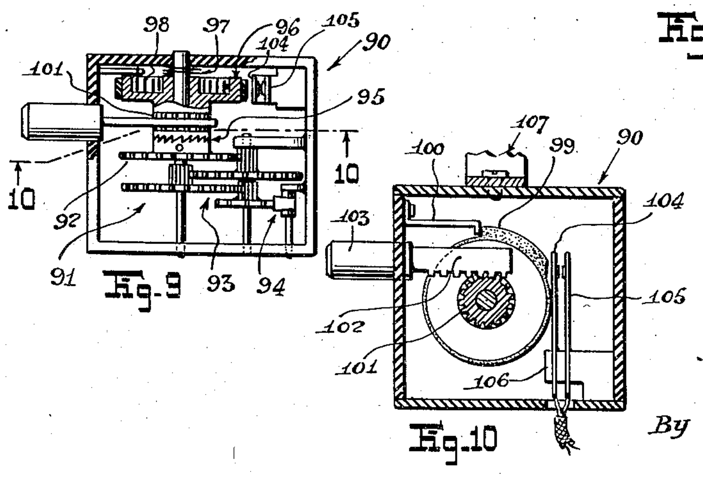
Figure 9 is a side elevational view, with parts in section, of a time-controlled switch employed in this machine.
Figure 10 is a section taken substantially on the line 10—10 of Figure 9.

The electric circuit of the present machine leads through a cable 74 to a plug 74a which is adapted to be connected to a light socket as of a 110-volt A. C. line as indicated in Figure 8. In this circuit there is a primary master switch 75 controlling all components of the machine. This may be a toggle switch which may be mounted on the front wall of the base of the machine as indicated in Figure 3. Across the circuit just beyond the primary master switch there is a pilot light 76. Preferably this pilot light is mounted on the carriage 42 in proximity with the back side of the record R to permit visual determination by the operator when a record is erased as is hereinafter fully explained.

Connected across the circuit beyond the primary master switch are the thermostat 68 and heater 50 in series. To permit visual determination of when the hub has reached a stabilized annealing temperature, a signal light 77 is connected across the thermostat, it being mounted for instance on the front wall of the base as shown in Figure 3. When the master switch is first closed and the hub heater 50 is cold and the associated thermostat is closed to provide a direct short across the light 77, thus preventing the light from giving a signal. When, however, the hub heater reaches its predetermined maximum temperature, the thermostat opens and connects the signal light across the circuit in series with the heater. The heater has typically a low impedance and the light, particularly, if of the neon type, has a relatively high impedance and will therefore light when the thermostat is open. As soon as the signal light comes on the operator will thus know that the hub has reached this stabilized temperature and that the machine is ready for use. During the continued operation of the machine this light will go on and off at intervals as the regulating thermostat closes and opens.

Figure 6:
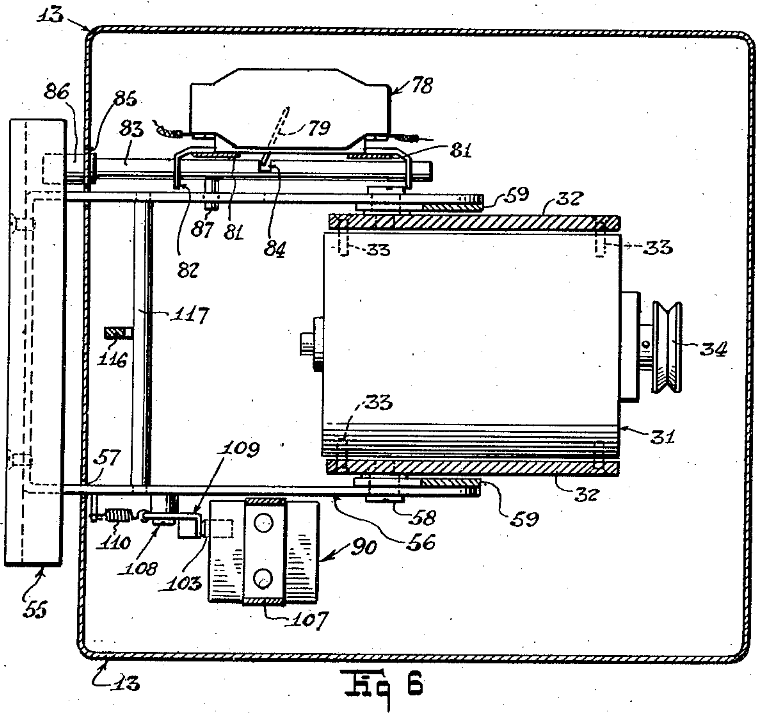
Figure 6 is a horizontal section taken substantially on the line 6—6 of Figure 3.
Figure 7:
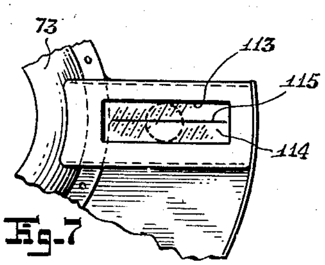
Figure 7 is a fractional elevational view as seen substantially from the line 7—7 of Figure 5.

Also connected across the circuit is a secondary master switch 78 and the motor 31 in series. This secondary master switch is mounted within the base 13 and may be a standard toggle-lighting switch having a pivoted operating lever 79 (Figures 3 and 6). The switch is supported by a bracket 80 depending from the top plate 14. The lower portion of this bracket is bifurcated to terminate in legs 81. These legs straddle the operating lever of the switch (Figure 6) and are secured by welding to a horizontal bail-shaped bracket 82 which in turn is secured to the side of the switch as by screws not shown, the position in which the switch is mounted being such that the operating lever 79 moves horizontally in forward and rearward directions. The bail-shaped bracket 82 has the end lugs thereof apertured to receive slidably a plunger 83. This plunger has a side notch 84 engaged by the operating lever 79 to couple it to the latter. The plunger projects through an opening 85 in the front wall of the base 13 and terminates in a fingerpiece 86 which is to be pressed inwardly to turn the switch off. The switch is turned on by depressing the handle 55. For this purpose there is a lateral pin 87 mounted on the plunger 83 in underlying relation with the left leg of the bail 56, and there is a cam 88 provided on the under side of this leg. When the handle 55 is depressed this cam engages the pin and moves the plunger forwardly to close the switch.

Also, as shown in Figure 8, there is a line 89 connected across the circuit beyond the secondary master switch 78, which serially includes the record heater 47, the switch 64 controlled by the carriage 42 and a time-controlled switch 90. This switch 90 is mounted on the base 13 and is closed by depressing the handle 55. Once the handle is depressed the switch is adapted to remain closed for a predetermined time interval, equal to the maximum heating interval required for erasing a record, and then to open automatically irrespective of whether the handle has been raised during the interim. By providing a switch which will so open automatically within a predetermined time interval, any possible overheating and damaging of a record is prevented should the operator inadvertently fail to detect when the record is erased and to then raise the handle 55 to move the heater from the record and to shut it off so as to allow the record to cool. The switch 90 may for example include a clockwork mechanism 91 comprising a main wheel 92 coupled by a train of gears 93 to an escapement 94. The main wheel is coupled through ratchet teeth 95 to a drive wheel 96 having a peripheral band of insulating material. This drive wheel is urged axially by a compression spring 97 into ratchet engagement with the main wheel 92, and is also urged counterclockwise, as appears in Figure 10, by a torsion spring 98 into a limit position defined by the abutment of one end of a peripheral cam 99 thereof against a stop pin 100. To charge the spring 98 and thus set the clockwork mechanism in operation, the wheel 96 is provided with a pinion 101 on its hub portion, which is engaged by a rack 102 that extends through the housing of the switch and terminates in a push rod 103 at its forward end. The cam 99 is provided to operate a switch blade 104 which cooperates with a stationary switch blade 105 both of which are mounted in an insulating stack 106. When the push rod is in its forwardmost position shown in Figure 10, the cam is removed from the switch blade 104 and the switch 90 is opened. As the push rod 103 is moved inwardly, the switch 90 is closed by the cam 99 during the initial movement of the rod and is retained closed by the dwell portion of the cam during the remaining movement of the rod. However, as soon as pressure is removed from the push rod, the spring 98 begins driving the clockwork mechanism to cause a gradual return of the rod and finally a reopening of the switch within the predetermined time interval mentioned. Typically, this interval may be of the order of one minute. Should the push rod be pressed inwardly again before the cam wheel has fully returned to open the switch 90, it will merely reset the clockwork mechanism to maintain the switch closed again for the full predetermined interval.

The time-controlled switch 90 is carried by a bracket 107 depending from the top plate 14, and is positioned to the right of the bail 56 as shown in Figures 3 and 4. Pivoted at 108 to the right leg of this bail is a cam lever 109 which is urged counterclockwise, as it appears in Figure 4, by a tension spring 110 against a stop pin 111 provided on the bail. This cam lever has an inclined turned-over lug 109*a* lying in the path of the push rod 103. As the hand lever 55 is depressed this lug engages the push rod and cams it inwardly to set the time switch 90. However, as the handle 55 is raised, the lug engages the under side of the push rod and causes the cam lever to be turned clockwise until the lug comes to the front face of the rod, whereupon the lug is moved upwardly past the rod into its initial position, this occurring whether or not the push rod has partially or fully returned when the handle is raised.

Figure 5:
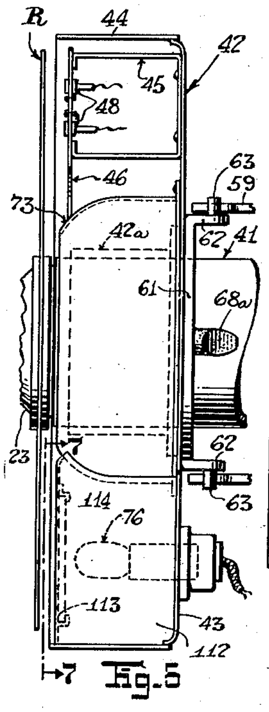
Figure 5 is a fractional top plan view of this machine of Figure 3.

In order that the pilot light 76 may enable observation of when a record is erased, this light is placed adjacent to the record. If the record is of a translucent or opaque material the light is preferably placed at its front side, but if the record is of a transparent material the light is placed at its back side. Since the usual records to be effaced are now of transparent material, the pilot light is shown, by way of preferred example, as being mounted at the rear of the record on the vertical plate 43 of the carriage 43 about midway between the outer and inner circumferential lines of the usable portion of the record (Figures 3 and 5). The light is encased in a housing 112 having, as an only opening, a window 113 in the front wall thereof facing toward the record. This window is covered by a glass 114 having thereon a dark line 115 transverse to the record. This is a reference line which can be observed through the record from the front of the machine. When the line is observed through a recorded portion of the record, it appears blurred but upon the embossed recordations of the record having become erased, the line appears sharp and thus apprises the operator as to when the record is erased.

If the records are opaque, then the reference line is placed so that it can be observed by light reflected against the record. Again, if the record bears a recordation, the line will appear blurred but when the recordation is erased the line appears sharp.

Preferably an interlock is provided between the record-clamping lever 27 and the hand lever 55—56 to prevent inadvertent unclamping of the record from the hub 22 and an attempted removal of the record while the record is under the influence of the heater 47 and the heater is so near the record as to present a hazard to the operator were he then to attempt to remove the record manually from the hub. This interlock may, for example, comprise a depending finger 116 on the lever 27 having a rearward edge arcuate about the pivot axis of the bail 56. Just to the rear of this finger there is a transverse rod 117 on the bail 56. When the handle is in other than its raised position, the finger 116 will by the abutment thereof against the rod 117 prevent the lever 27 from being drawn forwardly to unclamp a record. However, in the upper portion of the finger there is a notch 118 which lies in front of the cross rod 117 when the handle 55 is raised to allow the clamping lever 27 to then be moved forwardly to unclamp the record.

Figure 2:
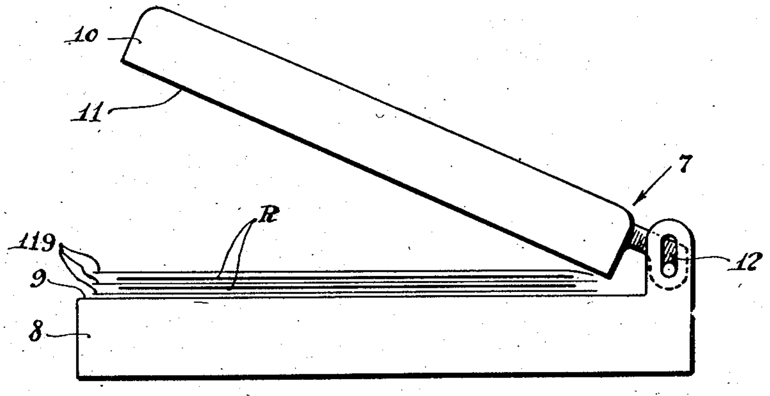
Figure 2 is a view of a small press for holding the records flat during the final cooling thereof after they have been taken from the reconditioning apparatus of Figure 1.

To operate the present machine, the operator will first move the primary master switch 75 to "on" position and wait until the light 77 is lit to indicate that the hub 22 has reached the proper operating temperature. Then he will draw forwardly the clamping lever 27, mount a record on the hub 22 and then release the lever 27 to cause the record to be clamped to the hub under pressure of the spring 30. Next he will depress the handle 55. This closes the secondary master switch 78 to start the motor running and closes the carriage-operated switch 64 and the time-controlled switch 90. The record is now turning and the heater 47 is on and in proximity with the record. The operator will now observe the reference line 115 through the record, and as soon as it appears sharp to indicate that the recordation is erased he will raise the handle 55. This moves the heater 47 from the record and shuts the heater current off to allow the record to cool, but leaves the record still turning. When the record ceases to flop and appears rigid, which is an indication that it has cooled to a temperature at or below its annealing temperature, the operator presses the fingerpiece 86 to stop the motor. Immediately then he removes the record from the hub 22 and lays it on a flat surface as of a paper pad or places it in the press 7 to allow the hub portion of the record to cool to room temperature. When successive records are stacked in the press 7 they are preferably separated by tissue sheets 119 as indicated in Figure 2.

The time-controlled switch 90 may be employed as a safety switch to prevent possible overheating of a record should the operator inadvertently fail to detect when the record has reached its erasing temperature. In this case, the time interval of the switch is set at approximately one minute as aforementioned. However, I may reduce the mass of the heater 47 and of the associated apparatus so that the temperature lag at the record, with respect to that of the heater, is low, and then rely upon a fixed heating interval for each record to be terminated automatically by the time-controlled switch 90. In this case the time interval of the switch may be set at 25 to 30 seconds. Such automatic determination of the heating interval is advantageous in that it reduces human error as a factor in operating the machine.

Figure 11:
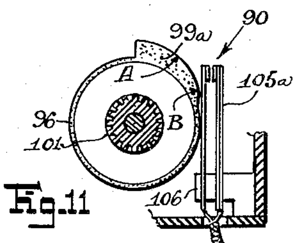
Figure 11 is a view similar to that of Figure 10 showing a modified form of the time-controlled switch to compensate it for ambient temperature variations.

Due to varying ambient room temperature, and the tendency of the average temperature of the machine to rise with continued use thereof, it is desirable that the switch 90 be temperature compensated particularly when it is relied on solely to establish the heating interval for erasing the record. In this case, for example, the cam 99 may be tapered to appear as 99*a* in Figure 11, and the normally-stationary switch blade 105 may be a bimetal as indicated at 105*a* in this figure, the bimetal being set to move away from the switch blade 104 as the ambient temperature rises and vice versa as the ambient temperature falls. Thus, when the temperature of the machine rises from continued use and/or from a rising ambient temperature, the switch contacts will break when the switch blade 104 engages an intermediate portion of the cam, as at A, to cut short the heating interval of the record; but when the machine is cool and a longer heating interval is required the contacts will not break until the switch blade 104 contacts the end portion B of the cam.

It is found that if the record disks are reconditioned by the present method without the clamping hub 22 being heated, the disks tend to become dish- or cup-shaped at their central portions. This must be prevented to insure that the disks will lie flat on the turntable of the recording machine. It is found that whether or not the central hub portion of the record is heated during the heating interval is not particularly important, but that it is of paramount importance that the central hub portion be maintained at the annealing temperature of the record material during the time that the outer usable portion of the record is being cooled to its annealing temperature. If then, when this outer portion is set, the record is immediately removed from the hub clamp and laid on a flat surface to cool, the record will be substantially flat when it is uniformly cooled. Usually, best results in this respect are obtained when the hub clamp grips only a narrow annular portion of the record adjacent to its central locating hole. While the temperature of the hub clamp is not critical it cannot be too low else cupping will result nor too high else the center hole of the record will be enlarged. Typically, a temperature variation of ±5° from the annealing temperature of the record is satisfactory.

The temperature to which the record is heated for erasing purposes is also not critical. For Vinylite, as by way of illustration, the embossed recordations disappear suddenly when the temperature is raised to 190° F. The record may however be heated substantially higher than this temperature, say 10 to 20°, without undergoing any ill effects. However, if the record is heated to a too-high temperature its bodily strength becomes so weak that it may be distorted out of round by centrifugal force.

Certain broad features of the present disclosure are also disclosed in the application of Frederick G. Kelly on "Reconditioning of Phonographic Records" filed on even date herewith and having common ownership with this invention, and are claimed therein.

The embodiments of my invention herein particularly shown and described are intended to be illustrative and not necessarily limitative of my invention, since the same are subject to changes and modifications without departure from the scope of my invention, which I endeavor to express according to the following claims.

I claim:

1. The method of treating thin, flexible disk records of thermoplastic material, to obliterate embossed recordations therefrom, which comprises continuously heating the hub portion of the record only to its annealing temperature, subjecting the portion of the record to be effaced to an erasing temperature substantially higher than said annealing temperature, and then cooling said record portion only to set the surface thereof, and spinning said record about its geometric axis to maintain said record portion substantially flat while the same is being heated and cooled.

2. The method of treating thin, flexible disk records of thermoplastic material, to obliterate embossed recordations therefrom, which comprises heating the record portion to be effaced, to reduce the recorded surface thereof to a smooth state, while spinning the record in air about its geomestric axis to hold it substantially flat, cooling said record portion to set the surface thereof while continuing to spin the record to maintain it flat, heating continuously the hub portion of the record during the entire time the record is being spun, stopping the spinning and then cooling said hub portion, and subjecting the record to a flattening influence while said hub portion is being cooled.

3. The method of treating disk records of thermoplastic composition, to obliterate the embossed recordations therefrom, which comprises gripping the central hub portion of the record and spinning the record in air to maintain the outer portion thereof substantially flat, heating said outer record portion to reduce the surface thereof to a smooth state and then cooling said portion to set the surface thereof while the record is being spun, heating the said hub portion to a temperature less than said erasing temperature during the entire time the record is being spun, stopping said spinning, cooling said hub portion and subjecting the record to a flattening influence as said hub portion is cooled.

4. The method of treating disk records of thermoplastic composition, to obliterate the embossed recordations therefrom, which comprises gripping the central hub portion of the record and spinning the record about its central axis at a speed of the order of 750 R. P. M., heating the outer portion of the record at least to its erasing temperature, concurrently heating said hub portion of the record substantially to the annealing temperature of the record material, cooling said outer record portion in air to set the surface thereof while the record is being spun, and next releasing the grip on the hub portion of the record and holding the record flat under pressure as said hub portion is cooled.

5. A machine for reconditioning a disk-shaped phonographic record, to obliterate embossed recordations therefrom, comprising means for clamping said record at its central hub portion, means for rotating said clamping means to spin the record in air about its geometric axis, means for heating the outer remaining portion of the record to an erasing temperature, and separate means in proximity with said clamping means for heating the central portion of said record to an annealing temperature substantially lower than that of said erasing temperature.

6. A machine for reconditioning a disk-shaped phonographic record, to obliterate embossed recordations therefrom, comprising means for clamping said record at its central hub portion, means for rotating said clamping means to spin the record in air, means controllable to heat the outer remaining portion of the record to an erasing temperature and thereupon to allow the record to cool while the record is being spun, and separate means effective on said clamping means to maintain the hub portion of the record at an annealing temperature substantially lower than said erasing temperature while the outer portion of the record is cooled from said erasing temperature.

7. A machine for obliterating embossed grooves from disk phonographic records of thermoplastic material comprising rotatable holding means for engaging the central hub portion of the record for supporting the record for rotation about its geometric axis, means for rotating said holding means to maintain flat the outer remaining portion of the record, a heater placeable in effective condition to heat the outer remaining portion of the record uniformly to reduce the surface thereof to a smooth state, timing means for controlling automatically the maximum interval of influence of said heater on said record, and temperature-responsive means associated with and controlling said timing means for reducing and increasing said time interval respectively as the ambient temperature rises and falls.

8. A machine for obliterating embossed grooves from a disk phonographic record of thermoplastic material comprising means for engaging the central hub portion of the record and for spinning the record in air to maintain it substantially flat by centrifugal force, means for heating the outer remaining portion of the record to reduce the recorded surfaces thereof to a smooth state while the record is rotating, a source of light at one side of the record, and a reference mark positioned between said light and record and adapted to be observed by light from said source and influenced by said record to determine when the record is erased.

9. A machine for obliterating embossed grooves from a transparent disk phonographic record of thermoplastic material comprising means for engaging the central hub portion of the record and for spinning the record in air to maintain it substantially flat by centrifugal force, means for heating the outer remaining portion of the record to reduce the recorded surfaces thereof to a smooth state while the record is rotating, a source of light at one side of the record, and a reference mark positioned between said light and record for observation through the outer usable portion of the record from the other side thereof to determine, according to the apparent character of said mark, when the record is erased.

RICHARD M. SOMERS.

REFERENCES CITED

The following references are of record in the file of this patent:

UNITED STATES PATENTS

| Number | Name | Date |
|---|---|---|
| 2,265,032 | Feyrer | Dec. 2, 1941 |
| 2,340,161 | Van Deventer | Jan. 24, 1944 |
| 2,539,717 | Balmer | Jan. 30, 1951 |